(12) United States Patent
Wu et al.

(10) Patent No.: US 11,451,970 B2
(45) Date of Patent: Sep. 20, 2022

(54) APPARATUS AND METHOD OF PROCESSING COLLISION BETWEEN SSB TRANSMISSION AND PERIODIC TRANSMISSION

(71) Applicant: GUANGDONG OPPO MOBILE TELECOMMUNICATIONS CORP., LTD., Guangdong (CN)

(72) Inventors: Zuomin Wu, Guangdong (CN); Hao Lin, Neuilly-sur-Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/344,317

(22) Filed: Jun. 10, 2021

(65) Prior Publication Data

US 2021/0306863 A1 Sep. 30, 2021

Related U.S. Application Data

(63) Continuation of application No. PCT/CN2020/112264, filed on Aug. 28, 2020.
(Continued)

(51) Int. Cl.
*H04W 72/00* (2009.01)
*H04W 16/14* (2009.01)
(Continued)

(52) U.S. Cl.
CPC .......... *H04W 16/14* (2013.01); *H04B 7/0626* (2013.01); *H04L 5/0051* (2013.01);
(Continued)

(58) Field of Classification Search
CPC . H04W 56/001; H04W 8/005; H04W 40/246; H04W 72/12; H04W 74/0866;
(Continued)

(56) References Cited

U.S. PATENT DOCUMENTS 10,863,553 B2 * 12/2020 Lee .................. H04W 72/1247
2020/0280940 A1 * 9/2020 Kim ..................... H04J 11/0086
(Continued)

FOREIGN PATENT DOCUMENTS

| CN | 109644357 A | 4/2019 |
| CN | 109845372 A | 6/2019 |

(Continued)

OTHER PUBLICATIONS

English Translation of CN 11092828A from WIPO (Year: 2021).*
(Continued)

*Primary Examiner* — Salvador E Rivas
(74) *Attorney, Agent, or Firm* — Perkins Coie LLP

(57) ABSTRACT

An apparatus and a method of processing collision between synchronization signal/physical broadcast channel block (SSB) transmission and periodic transmission, applied in a shared spectrum are provided. The method includes obtaining, by a terminal device, a first candidate SSB position within a discovery burst transmission (DRS) window and obtaining, by the terminal device, a first resource for the periodic channel or signal transmission, wherein when the first resource is overlapped with the first candidate SSB position, determining, by the terminal device, whether the first resource is available for the periodic channel or signal transmission. This can solve issues in the prior art, provide a technical solution of handling a possible collision between an SSB and the periodic channel or signal, provide a simple implementation, provide a good communication performance, and/or provide high reliability.

30 Claims, 8 Drawing Sheets

300

302 — Obtaining, by a terminal device, a first candidate SSB position within a discovery burst transmission (DRS) window 304 — Obtaining, by the terminal device, a first resource for the periodic transmission, wherein when the first resource is overlapped with the first candidate SSB position, determining, by the terminal device, whether the first resource is available for the periodic transmission

Related U.S. Application Data

(60) Provisional application No. 62/894,263, filed on Aug. 30, 2019.

(51) Int. Cl.
| | |
|---|---|
| *H04B 7/06* | (2006.01) |
| *H04L 5/00* | (2006.01) |
| *H04W 8/00* | (2009.01) |
| *H04W 56/00* | (2009.01) |
| *H04W 74/08* | (2009.01) |
| *H04W 28/26* | (2009.01) |
| *H04W 72/04* | (2009.01) |
| *H04W 52/24* | (2009.01) |

(52) U.S. Cl.
CPC ........... *H04W 8/005* (2013.01); *H04W 28/26* (2013.01); *H04W 56/001* (2013.01); *H04W 72/005* (2013.01); *H04W 72/04* (2013.01); *H04W 74/0825* (2013.01); *H04W 52/24* (2013.01)

(58) Field of Classification Search
CPC ... H04W 72/04; H04W 72/005; H04W 28/26; H04W 52/24
See application file for complete search history.

(56) References Cited

U.S. PATENT DOCUMENTS

| | | | |
|---|---|---|---|
| 2020/0413356 A1 | 12/2020 | Wang et al. | |
| 2021/0219274 A1* | 7/2021 | Tang | ................ H04W 56/0015 |

FOREIGN PATENT DOCUMENTS

| | | | |
|---|---|---|---|
| CN | 110034881 A | | 7/2019 |
| CN | 110932828 A | * | 3/2020 |
| EP | 3911066 A1 | | 11/2021 |
| WO | 2018212619 A1 | | 11/2018 |
| WO | 2019143937 A1 | | 7/2019 |
| WO | 2019160331 A1 | | 8/2019 |

OTHER PUBLICATIONS

"3GPP TR 38.889 v.16.0.0", Dec. 2018, pp. 1-119 (Year: 2018).*
3GPP TSG RAN WG1 Meeting #94bis—R1-1810267—Chengdu, China, Oct. 8-12, 2018—LG Electronics, Physical layer design of DL signals and channels for NR unlicensed operation (6 pages).
International Search Report dated Nov. 30, 2020 of PCT /CN2020/ 112264 (2 pages).
Extended European Search Report for European Application No. 20857425.1 dated Dec. 9, 2021. 8 pages.
Qualcomm Incorporated "Initial access signals and channels for NR-U" R1-1907258; 3GPP TSG RAN WG1 Meeting #97; Reno, US; May 13-17, 2019. 19 pages.
Examination Report for Indian Application No. 202117039580 dated Apr. 20, 2022. 5 pages with English translation.
Motorola Mobility et al. "Initial access procedure for NR-U" R1-1909391; 3GPP TSG RAN WG1 #98; Prague, CZ; Aug. 26-30, 2019. 6 pages.
Notice of Reasons for Refusal for Japanese Application No. 2021-539066 dated Jul. 8, 2022. 20 pages with English translation.

* cited by examiner

APPARATUS AND METHOD OF PROCESSING COLLISION BETWEEN SSB TRANSMISSION AND PERIODIC TRANSMISSION

CROSS-REFERENCE TO RELATED APPLICATIONS

The present application is a continuation application of International Application No. PCT/CN2020/112264, filed on Aug. 28, 2020, which claims priority to U.S. provisional application No. 62/894,263, filed on Aug. 30, 2019. The present application claims priority and the benefit of the above-identified applications and the above-identified applications are incorporated by reference herein in their entireties.

BACKGROUND OF DISCLOSURE

1. Field of the Disclosure

The present disclosure relates to the field of communication systems, and more particularly, to an apparatus and a method of processing collision between synchronization signal/physical broadcast channel block (SSB, or SS/PBCH block) transmission and periodic transmission, applied in a shared spectrum, which can provide a good communication performance and high reliability.

2. Description of the Related Art

In a 5th generation (5G) mobile communication system, or a new radio (NR) system, a base station needs to transmit, to one or more user equipments (UEs), synchronization signal/physical broadcast channel (PBCH) blocks (SSBs), such that one or more UEs can perform synchronization, system information acquisition, and measurement, etc.

In an unlicensed band, an unlicensed spectrum is a shared spectrum. Communication equipments in different communication systems can use the shared spectrum as long as the equipment meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel In other words, when the base station shares its own channel occupancy time with the UE, the UE can use an LBT mode with higher priority than that used by the UE itself to obtain the channel, thereby obtaining the channel with greater probability.

A mechanism of handling a possible collision between a synchronization signal/physical broadcast channel (PBCH) block (SSB, or SS/PBCH block) and a periodic channel or signal is an open issue. Therefore, there is a need for an apparatus and a method of processing collision between synchronization signal/physical broadcast channel block (SSB, or SS/PBCH block) transmission and periodic transmission, applied in a shared spectrum, which can solve issues in the prior art, provide a technical solution of handling a possible collision between an SSB and the periodic channel or signal, provide a simple implementation, provide a good communication performance, and/or provide high reliability.

SUMMARY

An object of the present disclosure is to propose an apparatus and a method of processing collision between synchronization signal/physical broadcast channel block (SSB, or SS/PBCH block) transmission and periodic transmission, applied in a shared spectrum, which can solve issues in the prior art, provide a technical solution of handling a possible collision between an SSB and the periodic channel or signal, provide a simple implementation, provide a good communication performance, and/or provide high reliability.

In a first aspect of the present disclosure, a method of processing collision between synchronization signal/physical broadcast channel block (SSB, or SS/PBCH block) transmission and periodic downlink transmission, applied in a shared spectrum is provided. The method comprises: obtaining, by a terminal device, a first candidate SSB position within a discovery burst transmission (DRS) window; and obtaining, by the terminal device, a first resource for the periodic downlink transmission, wherein when the first resource is overlapped with the first candidate SSB position, determining, by the terminal device, whether the first resource is available for the periodic downlink transmission.

In a second aspect of the present disclosure, a method of processing collision between synchronization signal/physical broadcast channel block (SSB, or SS/PBCH block) transmission and periodic uplink transmission, applied in a shared spectrum is provided. The method comprises: obtaining, by a terminal device, a first candidate SSB position within a discovery burst transmission (DRS) window; and obtaining, by the terminal device, a first resource for the periodic uplink transmission, wherein when the first resource is overlapped with the first candidate SSB position, not sending, by the terminal device, the periodic uplink transmission on the first resource.

In a third aspect of the present disclosure, a method of processing collision between synchronization signal/physical broadcast channel block (SSB, or SS/PBCH block) transmission and periodic transmission, applied in a shared spectrum is provided. The method comprises: obtaining, by a terminal device, a first candidate SSB position within a discovery burst transmission (DRS) window; and obtaining, by the terminal device, a first resource for the periodic transmission, wherein when the first resource is overlapped with the first candidate SSB position, determining, by the terminal device, whether the first resource is available for the periodic transmission.

In a fourth aspect of the present disclosure, a method of processing collision between synchronization signal/physical broadcast channel block (SSB, or SS/PBCH block) transmission and periodic downlink transmission, applied in a shared spectrum is provided. The method comprises: configuring, by a network device, a first candidate SSB position within a discovery burst transmission (DRS) window; and configuring, by the network device, a first resource for the periodic downlink transmission, wherein when the first resource is overlapped with the first candidate SSB position, controlling a terminal device by the network device to determine whether the first resource is available for the periodic downlink transmission.

In a fifth aspect of the present disclosure, a method of processing collision between synchronization signal/physical broadcast channel block (SSB, or SS/PBCH block) transmission and periodic uplink transmission, applied in a shared spectrum is provided. The method comprises: configuring, by a network device, a first candidate SSB position within a discovery burst transmission (DRS) window; and configuring, by the network device, a first resource for the periodic uplink transmission, wherein when the first resource is overlapped with the first candidate SSB position, controlling the terminal device by the network device not to send the periodic uplink transmission on the first resource.

In a sixth aspect of the present disclosure, a method of processing collision between synchronization signal/physical broadcast channel block (SSB, or SS/PBCH block) transmission and periodic transmission, applied in a shared spectrum is provided. The method comprises: configuring, by a network device, a first candidate SSB position within a discovery burst transmission (DRS) window; and configuring, by the network device, a first resource for the periodic transmission, wherein when the first resource is overlapped with the first candidate SSB position, controlling the terminal device by the network device to determine whether the first resource is available for the periodic transmission.

In a seventh aspect of the present disclosure, a terminal device includes a memory, a transceiver, and a processor coupled to the memory and the transceiver. The processor is configured to: obtain a first candidate SSB position within a discovery burst transmission (DRS) window; and obtain a first resource for the periodic downlink transmission, wherein when the first resource is overlapped with the first candidate SSB position, the processor determines whether the first resource is available for the periodic downlink transmission.

In an eighth aspect of the present disclosure, a terminal device includes a memory, a transceiver, and a processor coupled to the memory and the transceiver. The processor is configured to: obtain a first candidate SSB position within a discovery burst transmission (DRS) window; and obtain a first resource for the periodic uplink transmission, wherein when the first resource is overlapped with the first candidate SSB position, the transceiver does not send the periodic uplink transmission on the first resource.

In a ninth aspect of the present disclosure, a terminal device includes a memory, a transceiver, and a processor coupled to the memory and the transceiver. The processor is configured to: obtain a first candidate SSB position within a discovery burst transmission (DRS) window; and obtain a first resource for the periodic transmission, wherein when the first resource is overlapped with the first candidate SSB position, the processor determines whether the first resource is available for the periodic transmission.

In a tenth aspect of the present disclosure, a network device includes a memory, a transceiver, and a processor coupled to the memory and the transceiver. The processor is configured to: configure a first candidate SSB position within a discovery burst transmission (DRS) window; and configure a first resource for the periodic downlink transmission, wherein when the first resource is overlapped with the first candidate SSB position, the processor controls a terminal device to determine whether the first resource is available for the periodic downlink transmission.

In an eleventh aspect of the present disclosure, a network device includes a memory, a transceiver, and a processor coupled to the memory and the transceiver. The processor is configured to: configure a first candidate SSB position within a discovery burst transmission (DRS) window; and configure a first resource for the periodic uplink transmission, wherein when the first resource is overlapped with the first candidate SSB position, the processor controls the terminal device not to send the periodic uplink transmission on the first resource.

In a twelfth aspect of the present disclosure, a network device includes a memory, a transceiver, and a processor coupled to the memory and the transceiver. The processor is configured to: configure a first candidate SSB position within a discovery burst transmission (DRS) window; and configure a first resource for the periodic transmission, wherein when the first resource is overlapped with the first candidate SSB position, the processor controls the terminal device to determine whether the first resource is available for the periodic transmission.

In a thirteenth aspect of the present disclosure, a non-transitory machine-readable storage medium has stored thereon instructions that, when executed by a computer, cause the computer to perform the above method.

In a fourteenth aspect of the present disclosure, a chip includes a processor, configured to call and run a computer program stored in a memory, to cause a device in which the chip is installed to execute the above method.

In a fifteenth aspect of the present disclosure, a computer readable storage medium, in which a computer program is stored, causes a computer to execute the above method.

In a sixteenth aspect of the present disclosure, a computer program product includes a computer program, and the computer program causes a computer to execute the above method.

In a seventeenth aspect of the present disclosure, a computer program causes a computer to execute the above method.

BRIEF DESCRIPTION OF DRAWINGS

In order to more clearly illustrate the implementations of the present disclosure or related art, the following figures will be described in the implementations are briefly introduced. It is obvious that the drawings are merely some implementations of the present disclosure, a person having ordinary skill in this field can obtain other figures according to these figures without paying the premise.

DETAILED DESCRIPTION OF IMPLEMENTATIONS

Implementations of the present disclosure are described in detail with the technical matters, structural features, achieved objects, and effects with reference to the accompanying drawings as follows. Specifically, the terminologies in the implementations of the present disclosure are merely for describing the purpose of the certain implementation, but not to limit the disclosure.

In the present disclosure, terminal device refers to a user equipment. A network device refers to a base station (BS) such as a gNB. A discovery burst transmission (DRS) window refers to a discovery reference signal window. Candidate SSB positions refer to SSB candidate positions. For a standalone system deployed in an unlicensed spectrum, a network device needs to send a synchronization signal/physical broadcast channel (PBCH) block (SSB, or SS/PBCH block) in time domain within a discovery burst transmission (DRS) window. In order to have more SSB transmission opportunities, there are multiple candidate SSB positions inside the DRS window. At the same time, if a channel or a signal is periodically configured, at some point of time, there might be the case where the periodic channel or signal partially or fully overlaps with one of the candidate SSB positions in a slot. In this case, how to solve this issue is a motivation of some implementations of the present disclosure.

Figure 1:
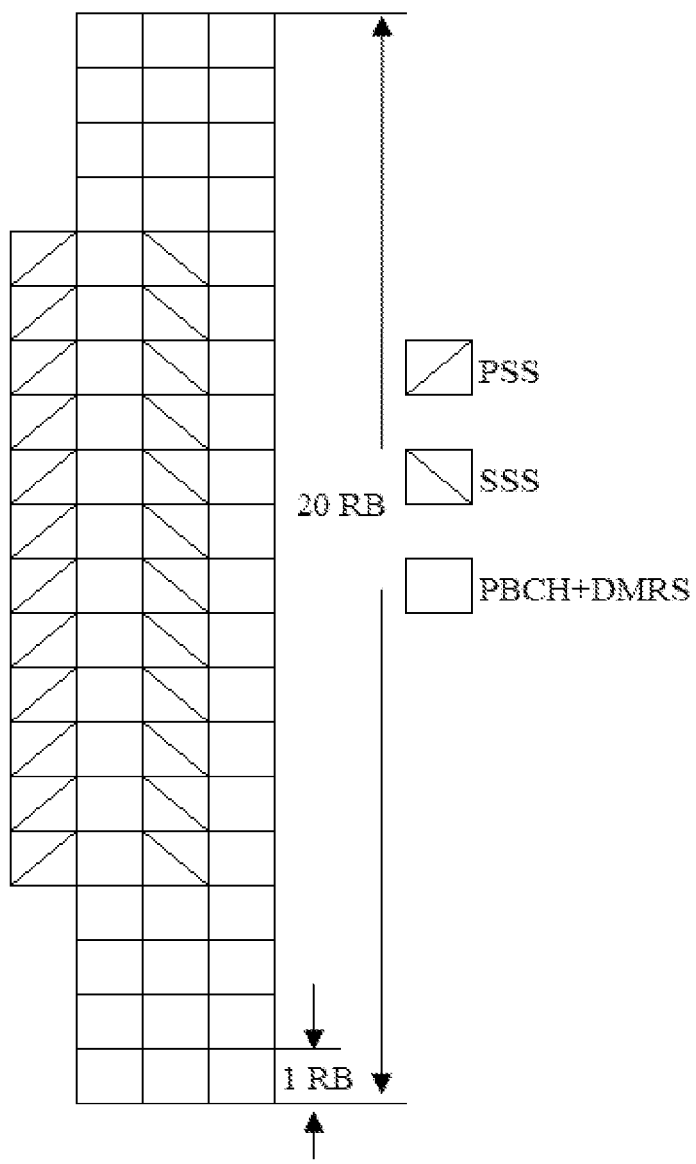
FIG. 1 is a schematic diagram illustrating a current synchronization signal/physical broadcast channel (PBCH) block (SSB) structure.
Figure 2:
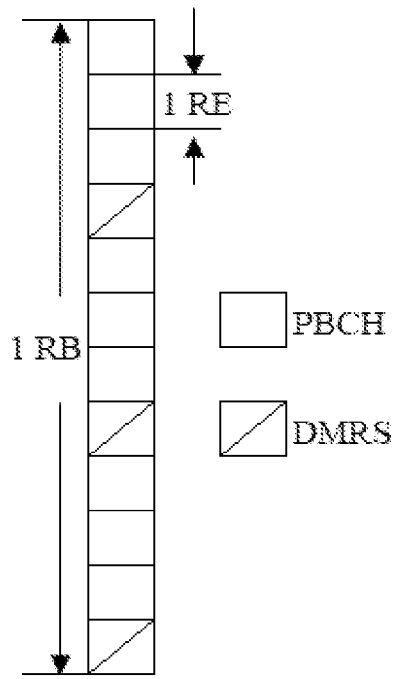
FIG. 2 is a schematic diagram illustrating a current PBCH payload multiplexing with demodulation reference signal (DMRS) on the same symbol.

FIG. 1 illustrates a current synchronization signal/physical broadcast channel (PBCH) block (SSB, or SS/PBCH block) structure. FIG. 1 illustrates that, in some implementations, a new radio (NR) SSB design is provided. FIG. 2 illustrates that, in some implementations, a current PBCH payload multiplexing with demodulation reference signal (DMRS) on the same symbol is provided. In NR Release 15, a synchronization signal, which is also called a synchronization signal/PBCH block (SSB, or SS/PBCH block), contains four orthogonal frequency-division multiplexing (OFDM) symbols. A first symbol is a primary synchronization signal (PSS) and it has 12 resource blocks (RBs) in frequency domain. Second and fourth symbols are PBCH symbols; while a third symbol contains both the secondary synchronization signal (SSS) and PBCH. For the PBCH, each RB contains data and demodulation reference signal (DMRS) and the DMRS pattern is illustrated in FIG. 1. Every four resource elements (REs) there is a DMRS. There are in total 48 RBs used for PBCH and it is equivalent to 576 REs (48*12=576), in which ¼ of the REs are used for DMRS. Therefore, the actual number of REs used for PBCH is 432 REs. It is understood that, 1 RE is also known as 1 subcarrier. An SSB consists of 4 OFDM symbols in the time domain and consists of 20 RBs (or 240 contiguous subcarriers) in the frequency domain.

The PSS is a sequence and it is selected from three candidate sequences. The PSS has a sequence identifier (ID), the sequence ID is from {0, 1, 2}. The SSS is a sequence selected from 336 sequences and the SSS also has a sequence ID ranging from {0, 1, 2, . . . , 355}. The PSS sequence ID and the SSS sequence ID are used to represent a serving cell ID, by the following equation.

$$N_{ID}^{CELL} = N_{ID}^{PSS} + 3 * N_{ID}^{SSS}$$

Figure 3:
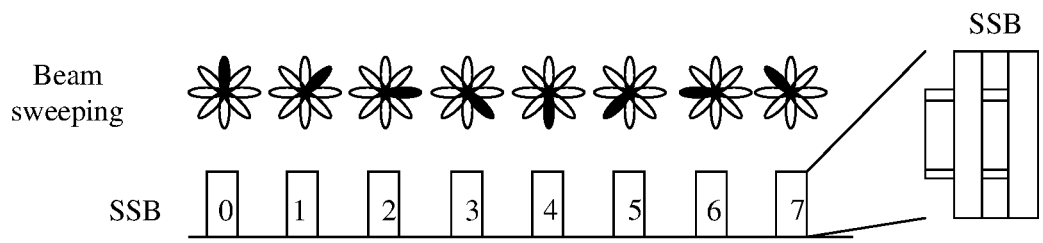
FIG. 3 is a schematic diagram illustrating a current beam sweeping.

FIG. 3 illustrates a current beam sweeping. In NR Release 15, multiple SSBs are transmitted in a so-called SSB burst. These multiple SSBs are often pointing to different directions with beam-forming technique, so that the coverage can be improved. Since one SSB pointing to a specific direction can only serve the users in that direction, multiple SSBs are needed to cover users from all directions. The SSB index is introduced for this purpose in Release 15. FIG. 3 illustrates that, in some implementations, eight SSBs are transmitted sequentially in time domain, each forming with a beam towards a direction. This process is called beam sweeping. After eight SSBs, the SSB burst can cover all the directions.

Figure 4:
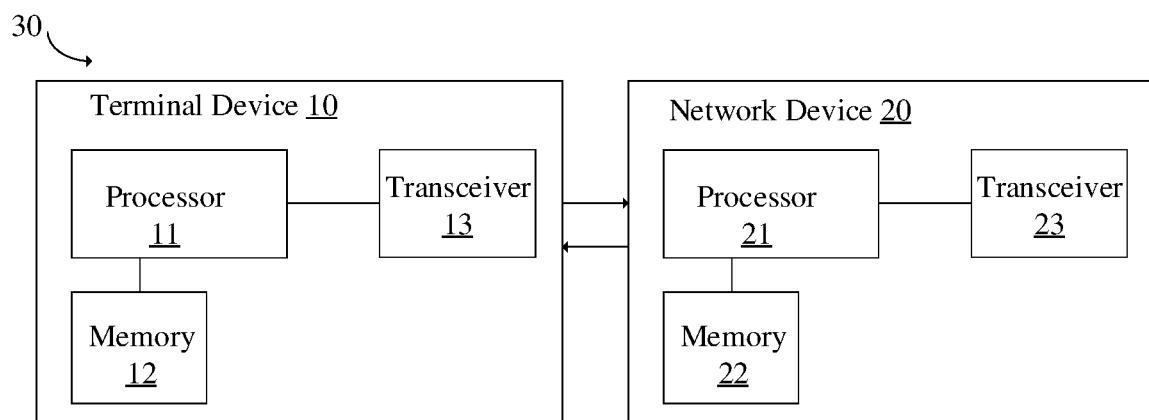
FIG. 4 is a block diagram of a terminal device (e.g., user equipment) and a network device (e.g., base station (BS) such as gNB) of communication in a communication network system according to an implementation of the present disclosure.

FIG. 4 illustrates that, in some implementations, a terminal device 10 such as a user equipment and a network device 20 such as a base station (BS) (e.g., gNB) of communication in a communication network system 30 according to an implementation of the present disclosure are provided. The communication network system 30 includes one or more terminal devices 10 of a cell and the network device 20. The terminal device 10 may include a memory 12, a transceiver 13, and a processor 11 coupled to the memory 12, the transceiver 13. The network device 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of first information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the implementations are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some implementations, the processor 11 is configured to: obtain a first candidate SSB position within a discovery burst transmission (DRS) window; and obtain a first resource for the periodic downlink transmission, wherein when the first resource is overlapped with the first candidate SSB position, the processor 11 determines whether the first resource is available for the periodic downlink transmission. This can solve issues in the prior art, provide a technical solution of handling a possible collision between an SSB and the periodic channel or signal, provide a simple implementation, and provide a good communication performance, and/or provide high reliability. Further, because the terminal devices need to access the cell by determining the one or more SSBs, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

In some implementations, the processor 11 is configured to: obtain a first candidate SSB position within a discovery burst transmission (DRS) window; and obtain a first resource for the periodic uplink transmission, wherein when the first resource is overlapped with the first candidate SSB position, the transceiver 13 does not send the periodic uplink transmission on the first resource. This can solve issues in the prior art, provide a technical solution of handling a possible collision between an SSB and the periodic channel or signal, provide a simple implementation, and provide a good communication performance, and/or provide high reliability. Further, because the terminal devices need to access the cell by determining the one or more SSBs, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

In some implementations, the processor 11 is configured to: obtain a first candidate SSB position within a discovery burst transmission (DRS) window; and obtain a first resource for the periodic transmission, wherein when the first resource is overlapped with the first candidate SSB position, the processor 11 determines whether the first resource is available for the periodic transmission. This can solve issues in the prior art, provide a technical solution of handling a possible collision between an SSB and the periodic channel or signal, provide a simple implementation, and provide a good communication performance, and/or provide high reliability. Further, because the terminal devices need to access the cell by determining the one or more SSBs, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

In some implementations, the processor 21 is configured to: configure a first candidate SSB position within a discovery burst transmission (DRS) window; and configure a first resource for the periodic downlink transmission, wherein when the first resource is overlapped with the first candidate SSB position, the processor 21 controls a terminal device 10 to determine whether the first resource is available for the periodic downlink transmission. This can solve issues in the prior art, provide a technical solution of handling a possible collision between an SSB and the periodic channel or signal, provide a simple implementation, and provide a good communication performance, and/or provide high reliability. Further, because the terminal devices need to access the cell by determining the one or more SSBs, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

In some implementations, the processor 21 is configured to: configure a first candidate SSB position within a discovery burst transmission (DRS) window; and configure a first resource for the periodic uplink transmission, wherein when the first resource is overlapped with the first candidate SSB position, the processor 21 controls the terminal device 10 not to send the periodic uplink transmission on the first resource. This can solve issues in the prior art, provide a technical solution of handling a possible collision between an SSB and the periodic channel or signal, provide a simple implementation, and provide a good communication performance, and/or provide high reliability. Further, because the terminal devices need to access the cell by determining the one or more SSBs, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

In some implementations, the processor 21 is configured to: configure a first candidate SSB position within a discovery burst transmission (DRS) window; and configure a first resource for the periodic transmission, wherein when the first resource is overlapped with the first candidate SSB position, the processor 21 controls the terminal device 10 to determine whether the first resource is available for the periodic transmission. This can solve issues in the prior art, provide a technical solution of handling a possible collision between an SSB and the periodic channel or signal, provide a simple implementation, and provide a good communication performance, and/or provide high reliability. Further, because the terminal devices need to access the cell by determining the one or more SSBs, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

Figure 5:
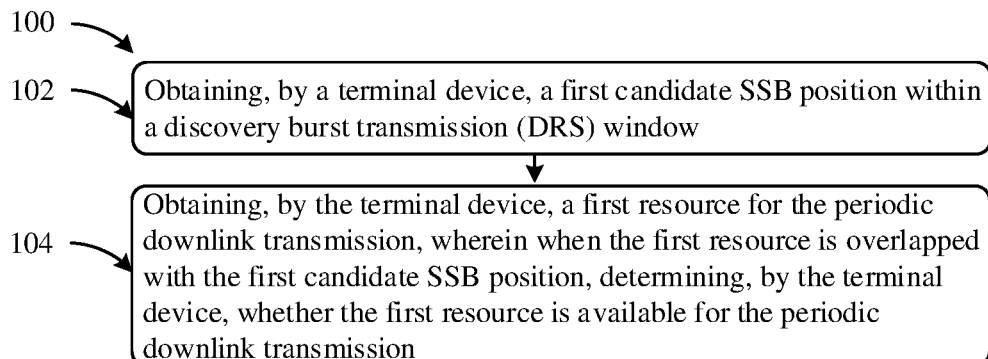
FIG. 5 is a flowchart illustrating a method of processing collision between synchronization signal/physical broadcast channel block (SSB, or SS/PBCH block) transmission and periodic downlink transmission, applied in a shared spectrum according to an implementation of the present disclosure.

FIG. 5 illustrates a method 100 of processing collision between synchronization signal/physical broadcast channel block (SSB, or SS/PBCH block) transmission and periodic downlink transmission, applied in a shared spectrum according to an implementation of the present disclosure. In some implementations, the method 100 includes: a block 102, obtaining, by a terminal device, a first candidate SSB position within a discovery burst transmission (DRS) window, and a block 104, obtaining, by the terminal device, a first resource for the periodic downlink transmission, wherein when the first resource is overlapped with the first candidate SSB position, determining, by the terminal device, whether the first resource is available for the periodic downlink transmission. This can solve issues in the prior art, provide a technical solution of handling a possible collision between an SSB and the periodic channel or signal, provide a simple implementation, provide a good communication performance, and/or provide high reliability. In an example, candidate SSB positions that may be used to transmit one or more SSBs that are not used for the periodic signal/channel transmission, and the implementation is simple. Further, because the terminal devices need to access the cell by determining the one or more SSBs during initial access procedure, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

In some implementations, one candidate SSB position consists of 4 OFDM symbols in the time domain and consists of 20 RBs (or 240 contiguous subcarriers) in the frequency domain. One candidate SSB position is a candidate resource for an SSB transmission. In some implementations, the first candidate SSB position corresponds to one or more candidate SSB indexes within a DRS window. The first candidate SSB position may be used to transmit one or more SSBs, that is to say, the first candidate SSB position comprises one or more candidate resources for one or more SSBs transmission. Optionally, the terminal device assumes that the one or more SSBs may be transmitted on the first candidate SSB position within the DRS window. In other words, the first candidate SSB position is for the terminal device to have opportunities to receive the one or more SSBs. In details, determining, by the terminal device, whether the first resource is available for the periodic downlink transmission, comprises: when the first resource is overlapped with the first candidate SSB position, determining, by the terminal device, whether receiving the periodic downlink transmission on the first resource or not.

In some implementations, the obtaining, by the terminal device, the first candidate SSB position within the discovery burst transmission (DRS) window, comprises: obtaining, by the terminal device, a first candidate SSB position set within the DRS window, wherein the first candidate SSB position set comprises the first candidate SSB position. In some implementations, the first candidate SSB position set corresponds to candidate SSB indexes within a DRS window according to the indication from the network device. The first candidate SSB position set comprises candidate SSB positions within a DRS window which may be used to transmit one or more SSBs according to the indication from the network device. Or in other words, the first candidate SSB position set comprises one or more candidate resources for one or more SSBs transmission according to the indication from the network device. In some implementations, the obtaining, by the terminal device, the first candidate SSB position set within the DRS window, comprises: obtaining, by the terminal device, an indication from a network device, wherein the indication indicates candidate SSB positions within the DRS window over which one or more SSBs may be transmitted; determining, by the terminal device, the first candidate SSB position set within the DRS window according to the indication, wherein the first candidate SSB position set comprises the candidate SSB positions within the DRS window over which one or more SSBs may be transmitted. In some implementations, the obtaining, by the terminal device, the first candidate SSB position set within the DRS window, comprises: obtaining, by the terminal device, a quasi co-located (QCL) information for one or more SSB transmissions in the DRS window; determining, by the terminal device, the first candidate SSB position set within the DRS window according to the QCL information for the SSB transmission. In an example, if the network device indicates that the network device may transmit one or more SSBs on candidate SSB positions corresponding to QCL index 0 or 2 or 3 but not 1, then all the candidate SSB positions with QCL index 0 or 2 or 3 will be grouped in the first candidate SSB position set.

In some implementations, the first resource comprises at least one resource corresponding to a periodic downlink resource configuration for the terminal device for receiving the periodic downlink transmission. In some implementations, the periodic downlink transmission comprises at least one of followings: a channel-state information reference signal (CSI-RS) or a physical downlink shared channel (PDSCH). In details, the terminal device may determine one or more resources which are used for periodic downlink transmissions according to a periodic resource configuration from a network device. In an example, the periodic resource configuration comprises CSI-RS resource configuration and/or Semi-Persistent Scheduling (SPS) PDSCH resource configuration.

In some implementations, the periodic downlink transmission comprises the CSI-RS, when the first resource is overlapped with the first candidate SSB position, determining, by the terminal device, whether the first resource is available for the periodic downlink transmission, comprises: conditions comprising when the first resource is partially or fully overlapped with the first candidate SSB position in time domain and the first resource is not overlapped with the first candidate SSB position in frequency domain, the CSI-RS corresponding to the first resource and corresponding to the first candidate SSB position are quasi co-located, receiving, by the terminal device, the CSI-RS on the first resource. In details, the CSI-RS corresponds to the first resource means that the CSI-RS may be transmitted on the first resource or the CSI-RS is to be transmitted on the first resource. The SSB corresponds to the first candidate SSB position means that the SSB may be transmitted on the first candidate SSB position or the first candidate SSB position comprises candidate resource for the SSB transmission. In an example, if the terminal device is configured with a CSI-RS resource (for example the first resource) in the same OFDM symbol(s) as an SSB (for example the SSB corresponding to the first candidate SSB position), the terminal device may assume that the CSI-RS and the SSB are quasi co-located with 'QCL-TypeD' if 'QCL-TypeD' is applicable. Furthermore, the terminal device should not expect to be configured with the CSI-RS in PRBs that overlap with those of the SSB. Thus, the terminal device can receive the CSI-RS on the CSI-RS resource. Optionally, the SSB corresponds to at least one of the candidate SSB positions in the first candidate SSB position set which may be used to transmit one or more SSBs. That is to say, when the first resource is overlapped with the first candidate SSB position in time domain, but not overlapped with the first candidate SSB position in frequency domain, and if the first resource is configured for CSI-RS transmission, under certain conditions such as QCL condition, it is possible for UE to receive both SSB on the first candidate SSB position and CSI-RS on the first resource, this can ensure high-priority SSB transmission and can allow periodic CSI-RS transmission, hence can improve the spectrum efficiency.

In some implementations, the method further comprises not receiving, by the terminal device, the CSI-RS on the first resource when at least one of the conditions is not met, wherein the conditions comprise when the first resource is partially or fully overlapped with the first candidate SSB position in time domain and the first resource is not overlapped with the first candidate SSB position in frequency domain, the CSI-RS corresponding to the first resource and the one or more SSBs corresponding to the first candidate SSB position are quasi co-located.

In some implementations, the periodic downlink transmission comprises the PDSCH, when the first resource is overlapped with the first candidate SSB position, determining, by the terminal device, whether the first resource is available for the periodic downlink transmission, comprises: when the first resource is fully overlapped with the first candidate SSB position in time domain, not receiving, by the terminal device, the PDSCH on the first resource. In this example, the candidate SSB positions that may be used to transmit the SSB are not used for the periodic signal/channel transmission, and the implementation is simple.

Figure 6:
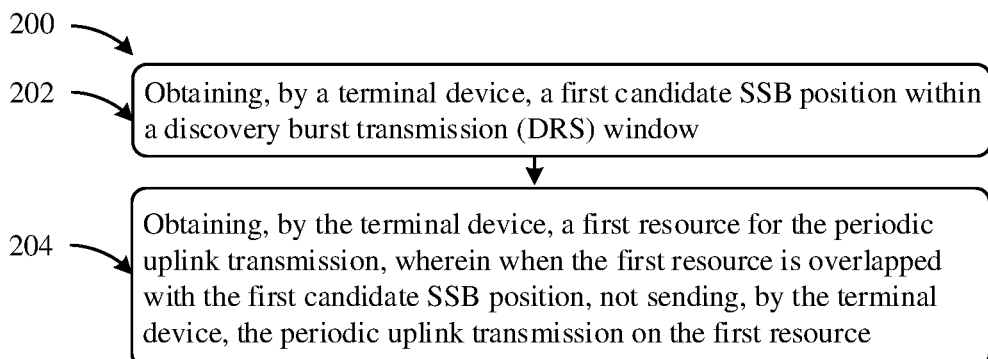
FIG. 6 is a flowchart illustrating a method of processing collision between synchronization signal/physical broadcast channel block (SSB, or SS/PBCH block) transmission and periodic uplink transmission, applied in a shared spectrum according to an implementation of the present disclosure.

FIG. 6 illustrates a method 200 of processing collision between synchronization signal/physical broadcast channel block (SSB, or SS/PBCH block) transmission and periodic uplink transmission, applied in a shared spectrum according to an implementation of the present disclosure. In some implementations, the method 200 includes: a block 202, obtaining, by a terminal device a first candidate SSB position within a discovery burst transmission (DRS) window, and a block 204, obtaining, by the terminal device, a first resource for the periodic uplink transmission, wherein when the first resource is overlapped with the first candidate SSB position, not sending, by the terminal device, the periodic uplink transmission on the first resource. This can solve issues in the prior art, provide a technical solution of handling a possible collision between an SSB and the periodic channel or signal, provide a simple implementation, and provide a good communication performance, and/or provide high reliability. Further, because the terminal devices need to access the cell by determining the one or more SSBs during initial access procedure, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

In some implementations, one candidate SSB position consists of 4 OFDM symbols in the time domain and consists of 20 RBs (or 240 contiguous subcarriers) in the frequency domain. One candidate SSB position is a candidate resource for an SSB transmission. In some implementations, the first candidate SSB position corresponds to one or more candidate SSB indexes within a DRS window. The first candidate SSB position may be used to transmit one or more SSBs, that is to say, the first candidate SSB position comprises one or more candidate resources for one or more SSBs transmission. Optionally, the terminal device assumes that the one or more SSBs may be transmitted on the first candidate SSB position within the DRS window. In other words, the first candidate SSB position is for the terminal device to have opportunities to receive the one or more SSBs.

In some implementations, the obtaining, by the terminal device, the first candidate SSB position within the discovery burst transmission (DRS) window, comprises: obtaining, by the terminal device, a first candidate SSB position set within the DRS window, wherein the first candidate SSB position set comprises the first candidate SSB position. In addition, the definition and acquisition method of first candidate SSB position and first candidate SSB position set are the same as those in the above implementations, and the explanation thereto will not be repeated here. In some implementations, the first candidate SSB position set corresponds to candidate SSB indexes within a DRS window according to the indication from the network device. Further, the first candidate SSB position set comprises candidate SSB positions within a DRS window which may be used to transmit one or more SSBs according to the indication from the network device. Or in other words, the first candidate SSB position set comprises one or more candidate resources for one or more SSBs transmission according to the indication from the network device. In some implementations, the obtaining, by the terminal device, the first candidate SSB position set within the DRS window, comprises: obtaining, by the terminal device, an indication from a network device, wherein the indication indicates candidate SSB positions within the DRS window over which one or more SSBs may be transmitted; determining, by the terminal device, the first candidate SSB position set within the DRS window according to the indication, wherein the first candidate SSB position set comprises the candidate SSB positions within the DRS window over which one or more SSBs may be transmitted. In some implementations, the obtaining, by the terminal device, the first candidate SSB position set within the DRS window, comprises: obtaining, by the terminal device, a quasi co-located (QCL) information for one or more SSB transmissions in the DRS window; determining, by the terminal device, the first candidate SSB position set within the DRS window according to the QCL information for the one or more SSB transmissions.

In some implementations, the first resource comprises at least one resource corresponding to a periodic uplink resource configuration for the terminal device for sending the periodic uplink transmission. In some implementations, the periodic uplink transmission comprises at least one of followings: a physical uplink control channel (PUCCH), a configured grant physical uplink shared channel (CG-PUSCH), a physical random access channel (PRACH), and a sounding reference signal (SRS). In some implementations, when the first resource is overlapped with the first candidate SSB position, not sending, by the terminal device, the periodic uplink transmission on the first resource, comprises: when the first resource is overlapped with the first candidate SSB position in time domain, not sending, by the terminal device, the periodic uplink transmission on the first resource. In details, the terminal device may determine one or more resources which are used for periodic uplink transmissions according to a periodic resource configuration from a network device. In an example, the periodic resource configuration comprises at least one of followings: PUCCH resource configuration, CG-PUSCH resource configuration, PRACH resource configuration, and SRS resource configuration.

In some implementations, the periodic uplink transmission comprises at least one of followings: the PUCCH, the CG-PUSCH, or the PRACH, when the first resource is overlapped with the first candidate SSB position, not sending, by the terminal device, the periodic uplink transmission on the first resource, comprises: when the first resource is partially or fully overlapped with the first candidate SSB position in time domain, not sending, by the terminal device, the PUCCH, the CG-PUSCH, or the PRACH on the first resource. In some implementations, the periodic uplink transmission comprises the SRS, when the first resource is overlapped with the first candidate SSB position, not sending, by the terminal device, the periodic uplink transmission on the first resource, comprises: when the first resource is fully overlapped with the first candidate SSB position in time domain, not sending, by the terminal device, the SRS on the first resource.

Figure 7:
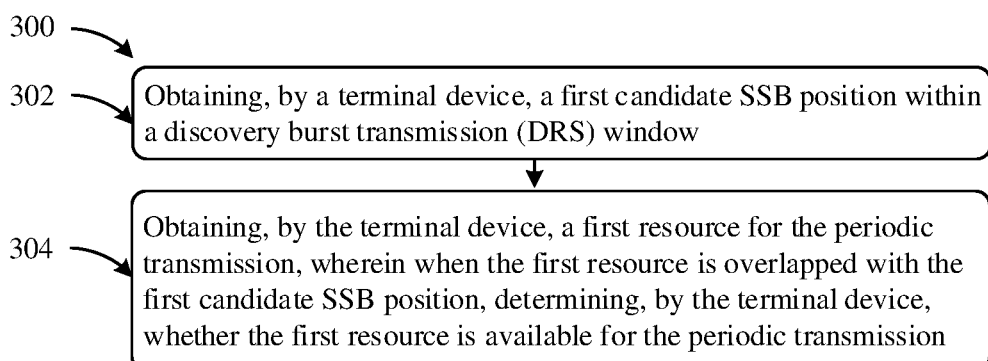
FIG. 7 is a flowchart illustrating a method of processing collision between synchronization signal/physical broadcast channel block (SSB, or SS/PBCH block) transmission and periodic transmission, applied in a shared spectrum, according to an implementation of the present disclosure.

FIG. 7 illustrates a method of processing collision between synchronization signal/physical broadcast channel block (SSB, or SS/PBCH block) transmission and periodic transmission, applied in a shared spectrum, according to an implementation of the present disclosure. In some implementations, the method 300 includes: a block 302, obtaining, by a terminal device, a first candidate SSB position within a discovery burst transmission (DRS) window, and a block 304, obtaining, by the terminal device, a first resource for the periodic transmission, wherein when the first resource is overlapped with the first candidate SSB position, determining, by the terminal device, whether the first resource is available for the periodic transmission. This can solve issues in the prior art, provide a technical solution of handling a possible collision between an SSB and the periodic channel or signal, provide a simple implementation, and provide a good communication performance, and/or provide high reliability. Further, because the terminal devices need to access the cell by determining the one or more SSBs during initial access procedure, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

In some implementations, the first resource comprises at least one resource corresponding to a periodic resource configuration for the terminal device for the periodic transmission. In some implementations, the periodic transmission comprises at least one of the followings: a channel state information-reference signal (CSI-RS), a channel state information-interference measurement (CSI-IM), a sounding reference signal (SRS), a physical downlink shared channel (PDSCH), a physical uplink control channel (PUCCH), a configured grant (CG) physical uplink shared channel (PUSCH), or a physical random access channel (PRACH).

In some implementations, one candidate SSB position consists of 4 OFDM symbols in the time domain and consists of 20 RBs (or 240 contiguous subcarriers) in the frequency domain. One candidate SSB position is a candidate resource for an SSB transmission. In some implementations, the first candidate SSB position corresponds to one or more candidate SSB indexes within a DRS window. In some implementations, the DRS window comprises a first candidate SSB position set, if the first candidate SSB position is one candidate SSB position in the first candidate SSB position set, when the first resource is overlapped with the first candidate SSB position, determining, by the terminal device, whether the first resource is available for the periodic transmission, comprises: when the first resource is partially or fully overlapped with the first candidate SSB position in time domain, determining, by the terminal device, the first resource is not available for the periodic transmission.

In some implementations, the DRS window comprises the first candidate SSB position set, if the first candidate SSB position is one candidate SSB position in the first candidate SSB position set, and if the periodic transmission comprises the CSI-RS, when the first resource is overlapped with the first candidate SSB position, determining, by the terminal device, whether the first resource is available for the periodic transmission, comprises: when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located, determining, by the terminal device, the first resource is available for the CSI-RS reception. That is to say, if the first candidate SSB position is one candidate SSB position in the first candidate SSB position set, when the first resource is overlapped with the first candidate SSB position in time domain, but not overlapped with the first candidate SSB position in frequency domain, and if the first resource is configured for CSI-RS transmission, under certain conditions such as QCL condition, it is possible for UE to receive both SSB on the first candidate SSB position and CSI-RS on the first resource, this can ensure high-priority SSB transmission and can allow periodic CSI-RS transmission, hence can improve the spectrum efficiency.

In some implementations, the DRS window comprises a first candidate SSB position set, the method further comprises: obtaining, by the terminal device, the first candidate SSB position set within the DRS window, wherein the first candidate SSB position set comprises the candidate SSB positions within the DRS window over which one or more SSBs may be transmitted according to the indication from the network device. Or in other words, the first candidate SSB position set comprises one or more candidate resources for one or more SSBs transmission according to the indication from the network device. In some implementations, the obtaining, by the terminal device, the first candidate SSB position set within the DRS window, comprises: obtaining, by the terminal device, an indication from a network device, wherein the indication indicates candidate SSB positions within the DRS window over which one or more SSBs may be transmitted; determining, by the terminal device, the first candidate SSB position set within the DRS window according to the indication. In some implementations, the obtaining, by the terminal device, the first candidate SSB position set within the DRS window, comprises: obtaining, by the terminal device, a quasi co-located (QCL) information for one or more SSB transmission in the DRS window; determining, by the terminal device, the first candidate SSB position set within the DRS window according to the QCL information for the SSBs transmission. In some implementations, the DRS window comprises a second candidate SSB position set, the second candidate SSB position set comprises the rest of SSB candidate positions excluded from the first SSB candidate position set. Or in other words, the second candidate SSB position set comprises one or more candidate SSB positions which are not used for SSB transmission according to the indication from the network device. In some implementations, if the first candidate SSB position is one candidate SSB position in the second candidate SSB position set, when the first resource is overlapped with the first candidate SSB position, determining, by the terminal device, whether the first resource is available for the periodic transmission, comprises: determining, by the terminal device, the first resource is available for the periodic transmission. That is to say, if the first candidate SSB position is determined not to be used for SSB transmission according to the indication from the network device, when the first resource is overlapped with the first candidate SSB position, the first resource can be used for UE to receive periodic downlink channels or signals, or to send periodic uplink channels or signals. Allowing periodic transmissions in this case can improve the spectrum efficiency.

Figure 8:
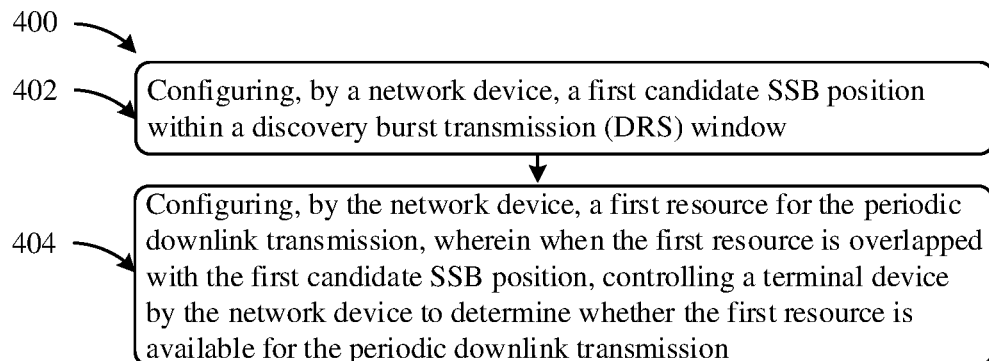
FIG. 8 is a flowchart illustrating a method of processing collision between synchronization signal/physical broadcast channel block (SSB) transmission and periodic downlink transmission, applied in a shared spectrum according to an implementation of the present disclosure.

FIG. 8 illustrates a method of processing collision between synchronization signal/physical broadcast channel block (SSB, or SS/PBCH block) transmission and periodic downlink transmission, applied in a shared spectrum according to an implementation of the present disclosure. In some implementations, the method 400 includes: a block 402, configuring, by a network device, a first candidate SSB position within a discovery burst transmission (DRS) window, and a block 404, configuring, by the network device, a first resource for the periodic downlink transmission, wherein when the first resource is overlapped with the first candidate SSB position, controlling a terminal device by the network device to determine whether the first resource is available for the periodic downlink transmission. Or wherein when the first resource is overlapped with the first candidate SSB position, determining, by the network device, whether the first resource is available for the periodic downlink transmission. This can solve issues in the prior art, provide a technical solution of handling a possible collision between an SSB and the periodic channel or signal, provide a simple implementation, and provide a good communication performance, and/or provide high reliability. Further, because the terminal device needs to access the cell by determining the one or more SSBs, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

In some implementations, the configuring, by the network device, the first candidate SSB position within the discovery burst transmission (DRS) window, comprises: configuring, by the network device, a first candidate SSB position set within the DRS window, wherein the first candidate SSB position set comprises the first candidate SSB position. In some implementations, the configuring, by the network device, the first candidate SSB position set within the DRS window, comprises: configuring, by the network device, an indication, wherein the indication indicates candidate SSB positions within the DRS window over which one or more SSBs may be transmitted; controlling the terminal device by the network device to determine the first candidate SSB position set within the DRS window according to the indication, wherein the first candidate SSB position set comprises the candidate SSB positions within the DRS window over which the one or more SSBs may be transmitted. In some implementations, the configuring, by the network device, the first candidate SSB position set within the DRS window, comprises: configuring, by the network device, a quasi co-located (QCL) information for one or more SSB transmissions in the DRS window; controlling the terminal device by the network device to determine the first candidate SSB position set within the DRS window according to the QCL information for the one or more SSB transmissions.

In some implementations, the first resource comprises at least one resource corresponding to a periodic downlink resource configuration for the terminal device for receiving the periodic downlink transmission. In some implementations, the periodic downlink transmission comprises at least one of followings: a channel-state information reference signal (CSI-RS) or a physical downlink shared channel (PDSCH). In some implementations, the periodic downlink transmission comprises the CSI-RS, when the first resource is overlapped with the first candidate SSB position, controlling the terminal device by the network device to determine whether the first resource is available for the periodic downlink transmission, comprises: conditions comprising when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located, controlling the terminal device by the network device to receive the CSI-RS on the first resource, or the network device determines to send the CSI-RS on the first resource. In some implementations, the method further comprises controlling the terminal device by the network device not to receive the CSI-RS on the first resource, or the network device determines not to send the CSI-RS on the first resource, when at least one of the conditions is not met, wherein the conditions comprise when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located. In some implementations, the periodic downlink transmission comprises the PDSCH, when the first resource is overlapped with the first candidate SSB position, controlling the terminal device by the network device to determine whether the first resource is available for the periodic downlink transmission, comprises: when the first resource is fully overlapped with the first candidate SSB position in time domain, controlling the terminal device by the network device not to receive the PDSCH on the first resource, or the network device determines not to send the PDSCH on the first resource.

Figure 9:
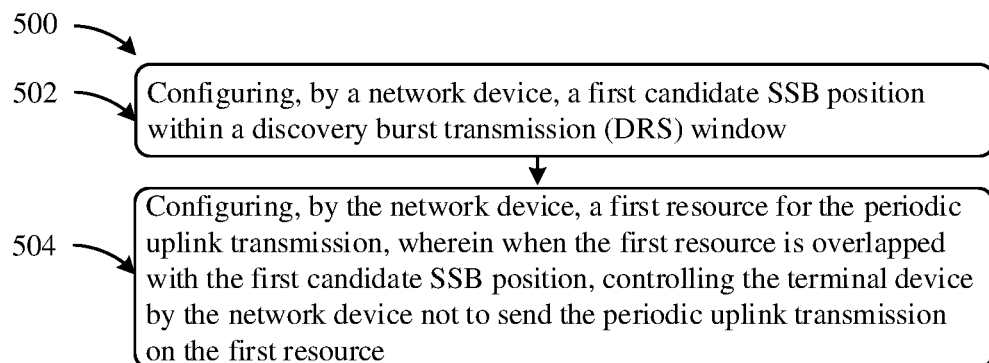
FIG. 9 is a flowchart illustrating a method of processing collision between synchronization signal/physical broadcast channel block (SSB, or SS/PBCH block) transmission and periodic uplink transmission, applied in a shared spectrum according to an implementation of the present disclosure.

FIG. 9 illustrates a method of processing collision between synchronization signal/physical broadcast channel block (SSB, or SS/PBCH block) transmission and periodic uplink transmission, applied in a shared spectrum according to an implementation of the present disclosure. In some implementations, the method 500 includes: a block 502, configuring, by a network device, a first candidate SSB position within a discovery burst transmission (DRS) window, and a block 504, configuring, by the network device, a first resource for the periodic uplink transmission, wherein when the first resource is overlapped with the first candidate SSB position, controlling the terminal device by the network device not to send the periodic uplink transmission on the first resource. Or wherein when the first resource is overlapped with the first candidate SSB position, determining, by the network device, whether the first resource is available for the periodic uplink transmission. This can solve issues in the prior art, provide a technical solution of handling a possible collision between an SSB and the periodic channel or signal, provide a simple implementation, and provide a good communication performance, and/or provide high reliability. Further, because the terminal device needs to access the cell by determining the one or more SSBs, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

In some implementations, the configuring, by the network device, the first candidate SSB position within the discovery burst transmission (DRS) window, comprises: configuring, by the network device, a first candidate SSB position set within the DRS window, wherein the first candidate SSB position set comprises the first candidate SSB position. In some implementations, the configuring, by the network device, the first candidate SSB position set within the DRS window, comprises: configuring, by the network device, an indication, wherein the indication indicates candidate SSB positions within the DRS window over which one or more SSBs may be transmitted; controlling the terminal device by the network device to determine the first candidate SSB position set within the DRS window according to the indication, wherein the first candidate SSB position set comprises the candidate SSB positions within the DRS window over which the one or more SSBs may be transmitted. In some implementations, the configuring, by the network device, the first candidate SSB position set within the DRS window, comprises: configuring, by the network device, a quasi co-located (QCL) information for one or more SSB transmissions in the DRS window; controlling the terminal device by the network device to determine the first candidate SSB position set within the DRS window according to the QCL information for the one or more SSB transmissions. In some implementations, the first resource comprises at least one resource corresponding to a periodic uplink resource configuration for the terminal device for sending the periodic uplink transmission.

In some implementations, the periodic uplink transmission comprises at least one of followings: a physical uplink control channel (PUCCH), a configured grant physical uplink shared channel (CG-PUSCH), a physical random access channel (PRACH), and a sounding reference signal (SRS). In some implementations, the periodic uplink transmission comprises at least one of followings: the PUCCH, the CG-PUSCH, or the PRACH, when the first resource is overlapped with the first candidate SSB position, controlling the terminal device by the network device not to send, the periodic uplink transmission on the first resource, comprises: when the first resource is partially or fully overlapped with the first candidate SSB position in time domain, controlling the terminal device by the network device not to send the periodic uplink transmission on the first resource, or not receiving, by the network device, the PUCCH, the CG-PUSCH, or the PRACH on the first resource. In some implementations, the periodic uplink transmission comprises the SRS, when the first resource is overlapped with the first candidate SSB position, controlling the terminal device by the network device not to send the periodic uplink transmission on the first resource, comprises: when the first resource is fully overlapped with the first candidate SSB position in time domain, controlling the terminal device by the network device not to send the SRS on the first resource, or not receiving, by the network device, the SRS on the first resource.

Figure 10:
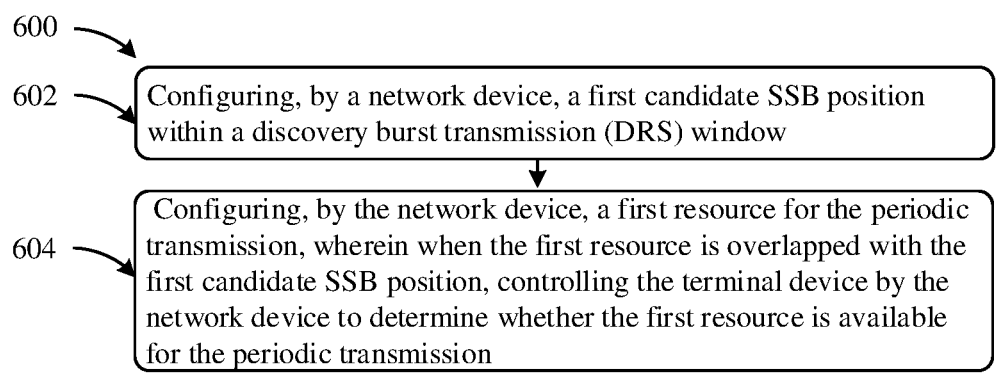
FIG. 10 is a flowchart illustrating a method of processing collision between synchronization signal/physical broadcast channel block (SSB, or SS/PBCH block) transmission and periodic transmission, applied in a shared spectrum, according to an implementation of the present disclosure.

FIG. 10 illustrates a method of processing collision between synchronization signal/physical broadcast channel block (SSB, or SS/PBCH block) transmission and periodic transmission, applied in a shared spectrum, according to an implementation of the present disclosure. In some implementations, the method 600 includes: a block 602, configuring, by a network device, a first candidate SSB position within a discovery burst transmission (DRS) window, and a block 604, configuring, by the network device, a first resource for the periodic transmission, wherein when the first resource is overlapped with the first candidate SSB position, controlling the terminal device by the network device to determine whether the first resource is available for the periodic transmission. Or wherein when the first resource is overlapped with the first candidate SSB position, determining, by the network device, whether the first resource is available for the periodic transmission. This can solve issues in the prior art, provide a technical solution of handling a possible collision between an SSB and the periodic channel or signal, provide a simple implementation, and provide a good communication performance, and/or provide high reliability. Further, because the terminal device needs to access the cell by determining the one or more SSBs, one or more SSB transmissions in the cell are more important. When one or more resources that may be used to transmit one or more SSBs collide with one or more periodic signal or one or more channel resources, the one or more SSB transmissions are given priority. Therefore, the one or more periodic signals or channels may not be transmitted on the one or more resources that may be used to transmit the one or more SSBs. This can ensure high-priority SSB transmission and is simple to implement.

In some implementations, the first resource comprises at least one resource corresponding to a periodic resource configuration for the terminal device for the periodic transmission. In some implementations, the periodic transmission comprises at least one of the followings: a channel state information-reference signal (CSI-RS), a channel state information-interference measurement (CSI-IM), a sounding reference signal (SRS), a physical downlink shared channel (PDSCH), a physical uplink control channel (PUCCH), a configured grant (CG) physical uplink shared channel (PUSCH), or a physical random access channel (PRACH). In some implementations, the DRS window comprises a first candidate SSB position set, if the first candidate SSB position is one candidate SSB position in the first candidate SSB position set, when the first resource is overlapped with the first candidate SSB position, controlling the terminal device by the network device to determine whether the first resource is available for the periodic transmission, comprises: when the first resource is partially or fully overlapped with the first candidate SSB position in time domain, controlling the terminal device by the network device to determine the first resource is not available for the periodic transmission, or determining, by the network device, the first resource is not available for the periodic transmission.

In some implementations, the DRS window comprises the first candidate SSB position set, if the first candidate SSB position is one candidate SSB position in the first candidate SSB position set, and if the periodic transmission comprises the CSI-RS, when the first resource is overlapped with the first candidate SSB position, controlling the terminal device by the network device to determine whether the first resource is available for the periodic transmission, comprises: when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located, controlling the terminal device by the network device to determine the first resource is available for the CSI-RS reception, or determining, by the network device, the first resource is available for the CSI-RS transmission. That is to say, if the first candidate SSB position is one candidate SSB position in the first candidate SSB position set, when the first resource is overlapped with the first candidate SSB position in time domain, but not overlapped with the first candidate SSB position in frequency domain, and if the first resource is configured for CSI-RS transmission, under certain conditions such as QCL condition, it is possible for gNB to send both SSB on the first candidate SSB position and CSI-RS on the first resource, this can ensure high-priority SSB transmission and can allow periodic CSI-RS transmission, hence can improve the spectrum efficiency.

In some implementations, the DRS window comprises a first candidate SSB position set, the method further comprises: configuring, by the network device, the first candidate SSB position set within the DRS window, wherein the first candidate SSB position set comprises the candidate SSB positions within the DRS window over which one or more SSBs may be transmitted according to the indication from the network device. Or in other words, the first candidate SSB position set comprises one or more candidate resources for one or more SSBs transmission according to the indication from the network device. In some implementations, the configuring, by the network device, the first candidate SSB position set within the DRS window, comprises: configuring, by the network device, an indication from a network device, wherein the indication indicates candidate SSB positions within the DRS window over which one or more SSBs may be transmitted; controlling the terminal device by the network device to determine the first candidate SSB position set within the DRS window according to the indication. In some implementations, the configuring, by the network device, the first candidate SSB position set within the DRS window, comprises: configuring, by the network device, a quasi co-located (QCL) information for one or more SSB transmission in the DRS window; controlling the terminal device by the network device to determine the first candidate SSB position set within the DRS window according to the QCL information for the SSBs transmission. In some implementations, the DRS window comprises a second candidate SSB position set, the second candidate SSB position set comprises the rest of SSB candidate positions excluded from the first SSB candidate position set. Or in other words, the second candidate SSB position set comprises one or more candidate SSB positions which are not used for SSB transmission according to the indication from the network device. In some implementations, if the first candidate SSB position is one candidate SSB position in the second candidate SSB position set, when the first resource is overlapped with the first candidate SSB position, controlling the terminal device by the network device to determine whether the first resource is available for the periodic transmission, comprises: controlling the terminal device by the network device to determine the first resource is available for the periodic transmission, or determining, by the network device, the first resource is available for the periodic transmission. That is to say, if the first candidate SSB position is determined not to be used for SSB transmission according to the indication from the network device, when the first resource is overlapped with the first candidate SSB position, the first resource can be used for gNB to send periodic downlink channels or signals, or to receive periodic uplink channels or signals. Allowing periodic transmissions in this case can improve the spectrum efficiency.

Figure 11:
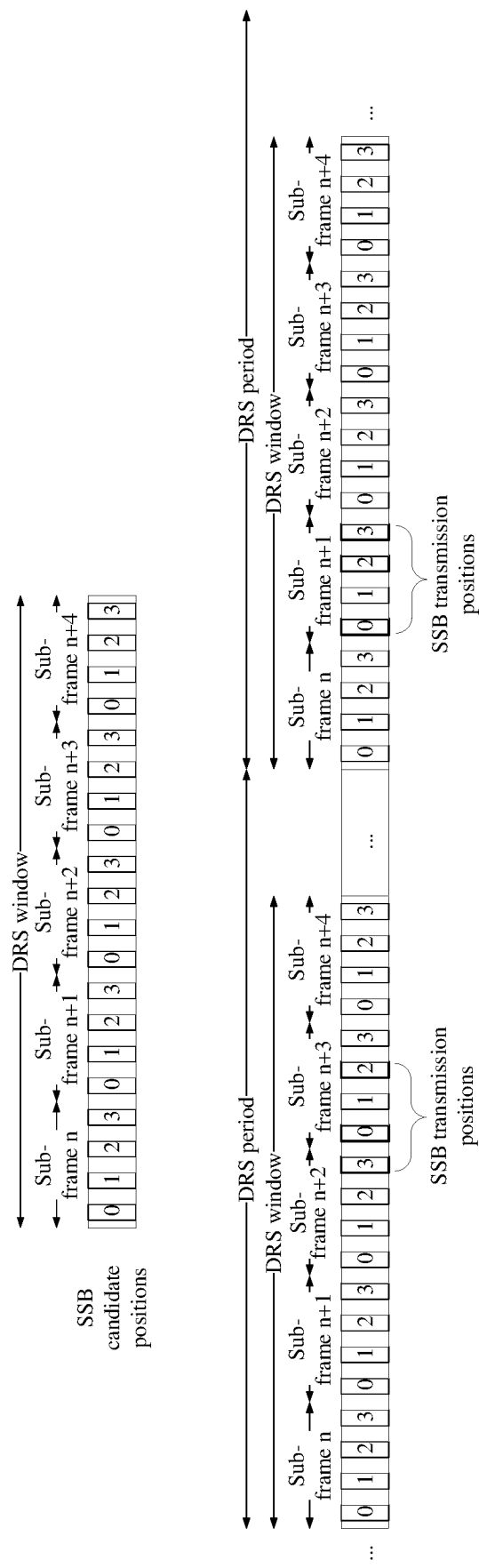
FIG. 11 is a schematic diagram illustrating a synchronization signal/physical broadcast channel (PBCH) block (SSB) candidate position according to an implementation of the present disclosure.
Figure 12:
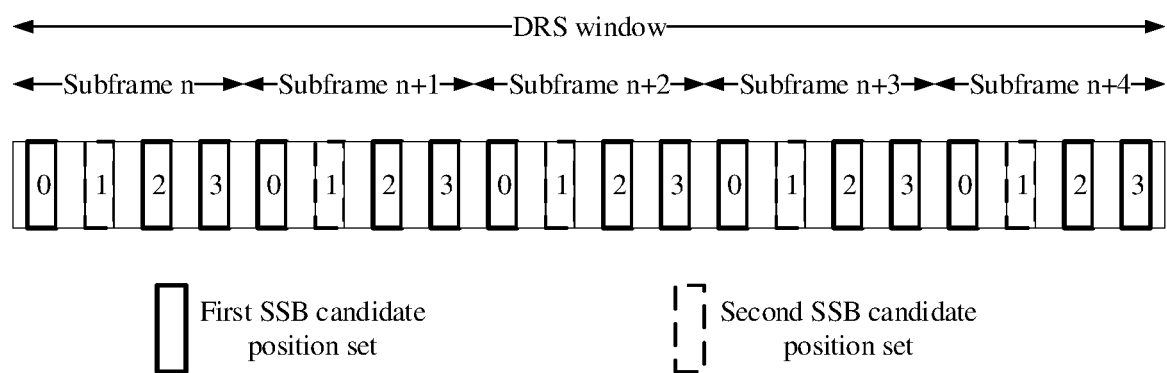
FIG. 12 is a schematic diagram illustrating a candidate SSB position according to an implementation of the present disclosure.

FIG. 11 illustrates a candidate synchronization signal/physical broadcast channel (PBCH) block (SSB) position according to an implementation of the present disclosure. FIG. 12 illustrates a candidate SSB position according to an implementation of the present disclosure. FIG. 11 and FIG. 12 illustrate that, in some implementations, the UE determines resources of a periodic channel or signal from a configuration of a base station. If defined resources are partially or fully overlapped with a first candidate SSB position in a time domain within a DRS window, the UE needs to determine if the above defined resources are used for the periodic channel or signal. The periodic channel or signal includes at least one of the followings: CSI-RS, CSI-IM, SRS, PDSCH, PUCCH, CG-PUSCH, or PRACH. The DRS window includes a first candidate SSB position set. The first candidate SSB position set includes all the candidate SSB positions over which one or more SSBs might be actually transmitted according to the indication from the base station. Optionally, the DRS window includes a second candidate SSB position set. The second candidate SSB position set includes the rest of the candidate SSB positions excluded from the first candidate SSB position set, which are not used for SSB transmission according to the indication from the base station. For example, in FIG. 12, the DRS window has 20 candidate SSB positions. Each candidate SSB position corresponds to a QCL index. The QCL index is used to represent a QCL relation between different candidate SSB positions. The candidate SSB positions with the same QCL index, means that if the base station sends the SSB on the candidate SSB positions, the same beam should be used. If the base station indicates that it might transmit SSBs on candidate SSB positions corresponding to QCL index 0 or 2 or 3 but not 1. Then, all the candidate SSB positions with QCL index 0 or 2 or 3 in the DRS window will be grouped in the first candidate SSB position set. And the rest of the candidate SSB positions in the DRS window will be grouped in the second candidate SSB position set.

If a first candidate SSB position belongs to the first candidate SSB position set, the UE can determine the above defined resources are used for the periodic channel or signal based on at least one of the followings.

An example: the UE determines that the above defined resources are not used for periodic channel or signal.

An example: If the UE determines that in the DRS window, prior to the above defined resources, other candidate SSB position (or positions) with the same QCL index as the first candidate SSB position carries an actual SSB. Optionally, if the UE determines that the first candidate SSB position does not carry the actual SSB, the UE confirms that the above defined resources are used for the periodic channel or signal. Optionally, the UE determines, in the DRS window, the actual SSB in other candidate SSB position (or positions) with the same QCL index as the first candidate SSB position via either explicit indication by the base station, either implicit indication by the base station, or a UE blind detection. In some implementations, if the UE determines in the DRS window, N actual SSBs in N candidate SSB positions with the same QCL index as the first candidate SSB position. Then, the UE determines the above defined resources are used for the periodic channel or signal. N is an integer greater or equal to 1. If N is greater than 1, it means that multiple SSBs with the same QCL relation are transmitted in the same DRS window. Optionally, N is configurable, and a typical value is 1.

An example: If the UE determines that in the DRS window, prior to the above defined resources, there is no candidate SSB position with the same QCL index as the first candidate SSB position carried the actual SSB, the UE confirms that the above defined resources are not used for periodic channel or signal. Optionally, the UE determines, in the DRS window, whether or not there is the actual SSB in other candidate SSB position (or positions) with the same QCL index as the first candidate SSB position via either explicit indication by the base station, either implicit indication by the base station, or a UE blind detection. In some implementations, if the UE does not determine in the DRS window, N actual SSBs in N candidate SSB positions with the same QCL index as the first candidate SSB position. Then, the UE determines the above defined resources are used for the periodic channel or signal. N is an integer greater or equal to 1. If N is greater than 1, it means that multiple SSBs with the same QCL relation are transmitted in the same DRS window. Optionally, N is configurable, and a typical value is 1.

An example: If the UE is not able to determine that in the DRS window, prior to the above defined resources, whether or not any candidate SSB position with the same QCL index as the first candidate SSB position carries the actual SSB, the UE confirms that the above defined resources are used for the periodic channel or signal.

An example: If the periodic channel or signal is a downlink channel or signal, and the above defined resources are not overlapped with the first candidate SSB position in a frequency domain. Optionally, if the downlink channel or signal to be transmitted on the above defined resources are QCL'ed with the SSB corresponding to the first candidate SSB position, the UE confirms that the above defined resources are used for the periodic channel or signal. Otherwise, the UE confirms that the above defined resources are not used for the periodic channel or signal.

An example: If the first candidate SSB position is located prior to any other candidate SSB positions with the same QCL index in the DRS window, the UE confirms that the above defined resources are not used for the periodic channel or signal.

Figure 13:
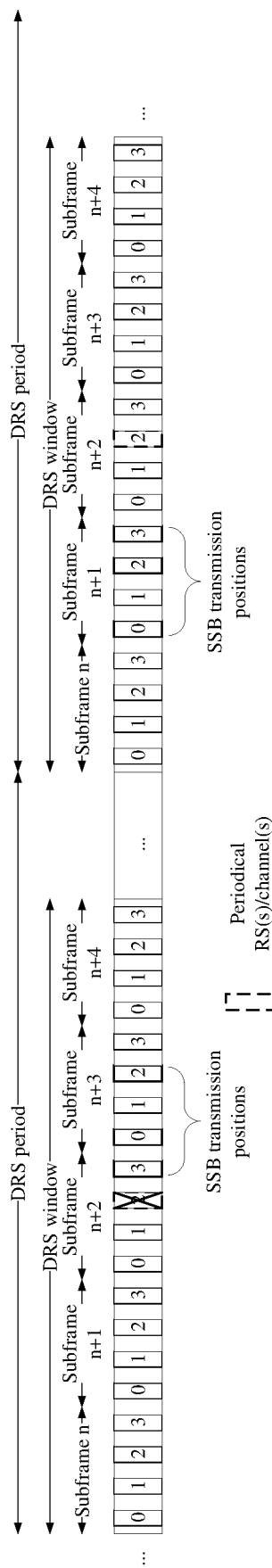
FIG. 13 is a schematic diagram illustrating a candidate SSB position according to an implementation of the present disclosure.

FIG. 13 illustrates a candidate SSB position according to an implementation of the present disclosure. FIG. 13 illustrates that some implementations are given for the following examples.

The following example: If the UE determines that in the DRS window, prior to the above defined resources, other candidate SSB position (or positions) with the same QCL index as the first candidate SSB position carries an actual SSB. Optionally, if the UE determines that the first candidate SSB position does not carry the actual SSB, the UE confirms that the above defined resources are used for the periodic channel or signal. Optionally, the UE determines, in the DRS window, the actual SSB in other candidate SSB position (or positions) with the same QCL index as the first candidate SSB position via either explicit indication by the base station, either implicit indication by the base station, or a UE blind detection. In some implementations, if the UE determines in the DRS window, N actual SSBs in N candidate SSB positions with the same QCL index as the first candidate SSB position. Then, the UE determines the above defined resources are used for the periodic channel or signal. N is an integer greater or equal to 1. If N is greater than 1, it means that multiple SSBs with the same QCL relation are transmitted in the same DRS window. Optionally, N is configurable, and a typical value is 1.

The following example: If the UE determines that in the DRS window, prior to the above defined resources, there is no candidate SSB position with the same QCL index as the first candidate SSB position carried the actual SSB, the UE confirms that the above defined resources are not used for periodic channel or signal. Optionally, the UE determines, in the DRS window, whether or not there is the actual SSB in other candidate SSB position (or positions) with the same QCL index as the first candidate SSB position via either explicit indication by the base station, either implicit indication by the base station, or a UE blind detection. In some implementations, if the UE does not determine in the DRS window, N actual SSBs in N candidate SSB positions with the same QCL index as the first candidate SSB position. Then, the UE determines the above defined resources are used for the periodic channel or signal. N is an integer greater or equal to 1. If N is greater than 1, it means that multiple SSBs with the same QCL relation are transmitted in the same DRS window. Optionally, N is configurable, and a typical value is 1.

In some implementations, if the first candidate SSB position belongs to the second candidate SSB position set, the UE can determine the above defined resources are used for the periodic channel or signal.

In some implementations, if the periodic channel or signal is a downlink channel or signal, the UE confirms the above defined resources are used for the periodic channel or signal, means that if the base station performs a listen before talk (LBT) with success, the base station transmits the periodic channel or signal over the above defined resources. Otherwise, the base station does not transmit the periodic channel or signal over the above defined resources. Accordingly, the UE can determine the presence of the periodic channel or signal on the above defined resources via assisted information (explicit or implicit indication) from the base station or a blind detection performed by the UE. Optionally, the UE confirms the above defined resources are not used for the periodic channel or signal, means that the UE assumes no actual periodic channel or signal is on the above defined resources. Therefore, the UE does not perform a detection or reception for the periodic channel or signal.

In some implementations, if the periodic channel or signal is an uplink channel or signal, the UE confirms the above defined resources are used for the periodic channel or signal, means that if the UE performs an LBT with success, the UE sends the periodic channel or signal over the above defined resources. Otherwise, the UE does not send the periodic channel or signal over the above defined resources. Optionally, the base station can perform a reception or detection of the periodic channel or signal on the above defined resources. Optionally, the UE confirms the above defined resources are not used for the periodic channel or signal, means that the UE does not send the periodic channel or signal over the above defined resources.

Commercial interests for some implementations are as follows. 1. solving issues in the prior art. 2. providing a technical solution of handling a possible collision between an SSB and the periodic channel or signal. 3. providing a good communication performance. 4. providing a high reliability. 5. Some implementations of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use. AR/VR device maker for example gaming, conference/seminar, education purposes. Some implementations of the present disclosure are a combination of "techniques/processes" that can be adopted in 3GPP specification to create an end product. Some implementations of the present disclosure could be adopted in the 5G NR unlicensed band communications. Some implementations of the present disclosure propose technical mechanisms.

Figure 14:
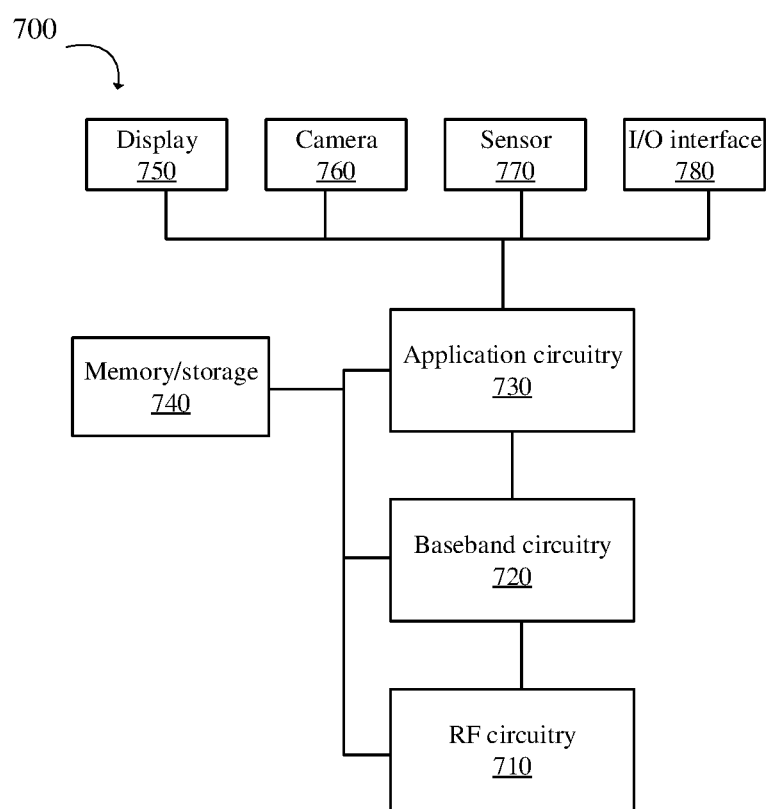
FIG. 14 is a block diagram of a system for wireless communication according to an implementation of the present disclosure.

FIG. 14 is a block diagram of an example system 700 for wireless communication according to an implementation of the present disclosure. Implementations described herein may be implemented into the system using any suitably configured hardware and/or software. FIG. 14 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some implementations, the baseband circuitry may provide for communication compatible with one or more radio technologies. For example, in some implementations, the baseband circuitry may support communication with an evolved universal terrestrial radio access network (EU-TRAN) and/or other wireless metropolitan area networks (WMAN), a wireless local area network (WLAN), a wireless personal area network (WPAN). Implementations in which the baseband circuitry is configured to support radio communications of more than one wireless protocol may be referred to as multi-mode baseband circuitry.

In various implementations, the baseband circuitry 720 may include circuitry to operate with signals that are not strictly considered as being in a baseband frequency. For example, in some implementations, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various implementations, the RF circuitry may include switches, filters, amplifiers, etc. to facilitate the communication with the wireless network. In various implementations, the RF circuitry 710 may include circuitry to operate with signals that are not strictly considered as being in a radio frequency. For example, in some implementations, RF circuitry may include circuitry to operate with signals having an intermediate frequency, which is between a baseband frequency and a radio frequency.

In various implementations, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some implementations, the electronic device circuitry may be implemented in, or functions associated with the circuitry may be implemented by, one or more software or firmware modules. In some implementations, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one implementation may include any combination of suitable volatile memory, such as dynamic random access memory (DRAM)), and/or non-volatile memory, such as flash memory.

In various implementations, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various implementations, the sensor 770 may include one or more sensing devices to determine environmental states and/or location first information related to the system. In some implementations, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various implementations, the display 750 may include a display, such as a liquid crystal display and a touch screen display. In various implementations, the system 700 may be a mobile computing device such as, but not limited to, a laptop computing device, a tablet computing device, a netbook, an ultrabook, a smartphone, a AR/VR glasses, etc. In various implementations, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the implementations of the present disclosure are realized using electronic hardware or combinations of software for computers and electronic hardware. Whether the functions run in hardware or software depends on the state of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned implementation since the working processes of the above-mentioned system, device, and unit are basically the same. For easy description and simplicity, these working processes will not be detailed.

It is understood that the disclosed system, device, and method in the implementations of the present disclosure can be realized with other ways. The above-mentioned implementations are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the implementations. Moreover, each of the functional units in each of the implementations can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the implementations of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred implementations, it is understood that the present disclosure is not limited to the disclosed implementations but is intended to cover various arrangements made without departing from the scope of the broadest interpretation of the appended claims.

What is claimed is:

1. A method of processing collision between synchronization signal/physical broadcast channel block (SSB) transmission and periodic downlink transmission, applied in a shared spectrum, wherein the method comprises:
   obtaining, by a terminal device, a first candidate SSB position within a discovery burst transmission (DRS) window; and
   obtaining, by the terminal device, a first resource for the periodic downlink transmission, wherein when the first resource is overlapped with the first candidate SSB position, determining, by the terminal device, whether the first resource is available for the periodic downlink transmission,
   wherein the periodic downlink transmission comprises the PDSCH, and
   wherein when the first resource is overlapped with the first candidate SSB position, determining, by the terminal device, whether the first resource is available for the periodic downlink transmission, comprises:
      when the first resource is fully overlapped with the first candidate SSB position in time domain,
      not receiving, by the terminal device, the PDSCH on the first resource.

2. The method according to claim 1, wherein the obtaining, by the terminal device, the first candidate SSB position within the discovery burst transmission (DRS) window, comprises:
   obtaining, by the terminal device, a first candidate SSB position set within the DRS window, wherein the first candidate SSB position set comprises the first candidate SSB position.

3. The method according to claim 2, wherein the obtaining, by the terminal device, the first candidate SSB position set within the DRS window, comprises:
   obtaining, by the terminal device, an indication from a network device, wherein the indication indicates candidate SSB positions within the DRS window over which one or more SSBs may be transmitted;
   determining, by the terminal device, the first candidate SSB position set within the DRS window according to the indication, wherein the first candidate SSB position set comprises the candidate SSB positions within the DRS window over which the one or more SSBs may be transmitted,
   or,
   the obtaining, by the terminal device, the first candidate SSB position set within the DRS window, comprises:
      obtaining, by the terminal device, a quasi co-located (QCL) information for one or more SSB transmissions in the DRS window;
      determining, by the terminal device, the first candidate SSB position set within the DRS window according to the QCL information for the one or more SSB transmissions.

4. The method according to claim 1, wherein the first resource comprises at least one resource corresponding to a periodic downlink resource configuration for the terminal device for receiving the periodic downlink transmission.

5. The method according to claim 1, wherein the periodic downlink transmission further comprises:
a channel-state information reference signal (CSI-RS).

6. The method according to claim 5, wherein
when the first resource is overlapped with the first candidate SSB position, determining, by the terminal device, whether the first resource is available for the periodic downlink transmission, comprises:
conditions comprising when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located,
receiving, by the terminal device, the CSI-RS on the first resource.

7. The method according to claim 5, further comprising not receiving, by the terminal device, the CSI-RS on the first resource when at least one of the conditions is not met, wherein the conditions comprise when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located.

8. The method according to claim 1, wherein the periodic downlink transmission comprises a physical downlink shared channel (PDSCH).

9. A method of processing collision between synchronization signal/physical broadcast channel block (SSB) transmission and periodic downlink transmission, applied in a shared spectrum, wherein the method comprises:
configuring, by a network device, a first candidate SSB position within a discovery burst transmission (DRS) window; and
configuring, by the network device, a first resource for the periodic downlink transmission, wherein when the first resource is overlapped with the first candidate SSB position, controlling a terminal device by the network device to determine whether the first resource is available for the periodic downlink transmission,
wherein the periodic downlink transmission comprises the PDSCH, and
wherein when the first resource is overlapped with the first candidate SSB position, determining, by the terminal device, whether the first resource is available for the periodic downlink transmission, comprises:
when the first resource is fully overlapped with the first candidate SSB position in time domain,
not receiving, by the terminal device, the PDSCH on the first resource.

10. The method according to claim 9, wherein the configuring, by the network device, the first candidate SSB position within the discovery burst transmission (DRS) window, comprises:
configuring, by the network device, a first candidate SSB position set within the DRS window, wherein the first candidate SSB position set comprises the first candidate SSB position.

11. The method according to claim 10, wherein the configuring, by the network device, the first candidate SSB position set within the DRS window, comprises:

configuring, by the network device, an indication, wherein the indication indicates candidate SSB positions within the DRS window over which one or more SSBs may be transmitted;
controlling the terminal device by the network device to determine the first candidate SSB position set within the DRS window according to the indication, wherein the first candidate SSB position set comprises the candidate SSB positions within the DRS window over which the one or more SSBs may be transmitted,
or,
the configuring, by the network device, the first candidate SSB position set within the DRS window, comprises:
configuring, by the network device, a quasi co-located (QCL) information for one or more SSB transmissions in the DRS window;
controlling the terminal device by the network device to determine the first candidate SSB position set within the DRS window according to the QCL information for the one or more SSB transmissions.

12. The method according to claim 9, wherein the first resource comprises at least one resource corresponding to a periodic downlink resource configuration for the terminal device for receiving the periodic downlink transmission.

13. The method according to claim 9, wherein the periodic downlink transmission further comprises:
a channel-state information reference signal (CSI-RS).

14. The method according to claim 13, wherein,
when the first resource is overlapped with the first candidate SSB position, controlling the terminal device by the network device to determine whether the first resource is available for the periodic downlink transmission, comprises:
conditions comprising when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located,
controlling the terminal device by the network device to receive the CSI-RS on the first resource,
and,
the method further comprises: controlling the terminal device by the network device not to receive the CSI-RS on the first resource when at least one of the conditions is not met, wherein the conditions comprise when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located.

15. The method according to claim 9, wherein the periodic downlink transmission comprises a physical downlink shared channel (PDSCH).

16. A terminal device of processing collision between synchronization signal/physical broadcast channel block (SSB) transmission and periodic downlink transmission, applied in a shared spectrum, wherein the terminal device comprises:
a memory;
a transceiver; and
a processor coupled to the memory and the transceiver;
wherein the processor is configured to:

obtain a first candidate SSB position within a discovery burst transmission (DRS) window; and obtain a first resource for the periodic downlink transmission, wherein when the first resource is overlapped with the first candidate SSB position, the processor determines whether the first resource is available for the periodic downlink transmission, wherein the periodic downlink transmission comprises the PDSCH, and wherein when the first resource is overlapped with the first candidate SSB position, determining, by the terminal device, whether the first resource is available for the periodic downlink transmission, comprises:

when the first resource is fully overlapped with the first candidate SSB position in time domain, not receiving, by the terminal device, the PDSCH on the first resource.

17. The terminal device according to claim 16, wherein the processor configured to obtain the first candidate SSB position within the discovery burst transmission (DRS) window, comprises:

the processor configured to obtain a first candidate SSB position set within the DRS window, wherein the first candidate SSB position set comprises the first candidate SSB position.

18. The terminal device according to claim 17, wherein the processor configured to obtain the first candidate SSB position set within the DRS window, comprises:

the processor configured to obtain an indication from a network device, wherein the indication indicates candidate SSB positions within the DRS window over which one or more SSBs may be transmitted;

the processor configured to determine the first candidate SSB position set within the DRS window according to the indication, wherein the first candidate SSB position set comprises the candidate SSB positions within the DRS window over which the one or more SSBs may be transmitted, or, the processor configured to obtain the first candidate SSB position set within the DRS window, comprises:

the processor configured to obtain a quasi co-located (QCL) information for one or more SSB transmissions in the DRS window;

the processor configured to determine the first candidate SSB position set within the DRS window according to the QCL information for the one or more SSB transmissions.

19. The terminal device according to claim 16, wherein the first resource comprises at least one resource corresponding to a periodic downlink resource configuration for the terminal device for receiving the periodic downlink transmission.

20. The terminal device according to claim 16, wherein the periodic downlink transmission further comprises:

a channel-state information reference signal (CSI-RS).

21. The terminal device according to claim 20, wherein when the first resource is overlapped with the first candidate SSB position, the processor configured to determine whether the first resource is available for the periodic downlink transmission, comprises:

conditions comprising when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located, the transceiver configured to receive the CSI-RS on the first resource.

22. The terminal device according to claim 20, wherein the transceiver does not receive the CSI-RS on the first resource when at least one of the conditions is not met, wherein the conditions comprise when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located.

23. The terminal device according to claim 16, wherein the periodic downlink transmission comprises a physical downlink shared channel (PDSCH).

24. A network device of processing collision between synchronization signal/physical broadcast channel block (SSB) transmission and periodic downlink transmission, applied in a shared spectrum, wherein the network device comprises:

a memory;

a transceiver; and a processor coupled to the memory and the transceiver;

wherein the processor is configured to:

configure a first candidate SSB position within a discovery burst transmission (DRS) window; and configure a first resource for the periodic downlink transmission, wherein when the first resource is overlapped with the first candidate SSB position, the processor controls a terminal device to determine whether the first resource is available for the periodic downlink transmission, wherein the periodic downlink transmission comprises the PDSCH, and wherein when the first resource is overlapped with the first candidate SSB position, determining, by the terminal device, whether the first resource is available for the periodic downlink transmission, comprises:

when the first resource is fully overlapped with the first candidate SSB position in time domain, not receiving, by the terminal device, the PDSCH on the first resource.

25. The network device according to claim 24, wherein the processor configured to configure the first candidate SSB position within the discovery burst transmission (DRS) window, comprises:

the processor configured to configure a first candidate SSB position set within the DRS window, wherein the first candidate SSB position set comprises the first candidate SSB position.

26. The network device according to claim 25, wherein the processor configured to configure the first candidate SSB position set within the DRS window, comprises:

the processor configured to configure an indication, wherein the indication indicates candidate SSB positions within the DRS window over which one or more SSBs may be transmitted;

the processor configured to control the terminal device to determine the first candidate SSB position set within the DRS window according to the indication, wherein the first candidate SSB position set comprises the candidate SSB positions within the DRS window over which the one or more SSBs may be transmitted, or, the processor configured to configure the first candidate SSB position set within the DRS window, comprises:
 the processor configured to configure a quasi co-located (QCL) information for one or more SSB transmissions in the DRS window;
 the processor configured to control the terminal device to determine the first candidate SSB position set within the DRS window according to the QCL information for the one or more SSB transmissions.

27. The network device according to claim 24, wherein the first resource comprises at least one resource corresponding to a periodic downlink resource configuration for the terminal device for receiving the periodic downlink transmission.

28. The network device according to claim 24, wherein the periodic downlink transmission further comprises:
 a channel-state information reference signal (CSI-RS).

29. The network device according to claim 28, wherein when the first resource is overlapped with the first candidate SSB position, the processor configured to control the terminal device to determine whether the first resource is available for the periodic downlink transmission, comprises:
 conditions comprising when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located,
 the processor configured to control the terminal device to receive the CSI-RS on the first resource,
 and,
 the processor controls the terminal device not to receive the CSI-RS on the first resource when at least one of the conditions is not met, the conditions comprise when the first resource is partially or fully overlapped with the first candidate SSB position in time domain and the first resource is not overlapped with the first candidate SSB position in frequency domain, the CSI-RS corresponding to the first resource and the SSB corresponding to the first candidate SSB position are quasi co-located.

30. The network device according to claim 24, wherein the periodic downlink transmission comprises a physical downlink shared channel (PDSCH).

* * * * *